April 24, 1973     F. H. NORTON     3,729,299

APPARATUS FOR MAKING FACE PLATES

Original Filed Jan. 20, 1969     2 Sheets-Sheet 1

April 24, 1973    F. H. NORTON    3,729,299
APPARATUS FOR MAKING FACE PLATES
Original Filed Jan. 20, 1969    2 Sheets-Sheet 2

United States Patent Office 3,729,299
Patented Apr. 24, 1973

3,729,299
APPARATUS FOR MAKING FACE PLATES
Frederick H. Norton, Gloucester, Mass., assignor to American Optical Corporation, Southbridge, Mass.
Original application Jan. 20, 1969, Ser. No. 835,113. Divided and this application Feb. 26, 1971, Ser. No. 119,342
Int. Cl. C03b 23/14, 25/00
U.S. Cl. 65—12                   2 Claims

ABSTRACT OF THE DISCLOSURE

Method and apparatus for making fused image-conducting fiber optic face plates and the like which are impervious to gases and free from gas inclusions and such therein.

---

This is a division of application Ser. No. 835,113, filed Jan. 20, 1969 now Pat. No. 3,625,669, issued Dec. 7, 1971.

This invention relates to a method and apparatus for making image-conducting face plates and the like and more particularly image-conducting face plates of the type comprising a very large number of adjacent elongated fiber-like elements formed of glass and disposed in regular closely packed side-by-side relation to each other and fused together in such a manner as to render same gas-impervious as well as free from entrapped gases, bubbles and the like which might otherwise impair the optical performance of such face plates.

As is well known, such an image-conducting fiber optic face plate even of small size, such as a plate which is only one-half inch in diameter, may comprise several thousand or more like thin, elongated, light-conducting elements having cores of high refractive index glass each clad within a surrounding layer of lower refractive index glass and disposed in adjacent generally parallel side-by-side relation to each other. Thus, in the formation of fiber optic face plates, small or large, a very large number of adjacent light-conducting fiber-like elements present a very large multiplicity of adjacent side wall surface portions all of which should be in completely fused-together relation to each other in the finished unitary integral structures so as to provide gas-impervious devices, and, at the same time, these devices in their finished form should not have any gases or air entrapped within interstices internally thereof.

Such entrapped air or gases can very well form bubbles or the like within such a structure which are detrimental to the optical performance thereof as image-conducting face plates, as has already been explained in detail in U.S. Pat. No. 3,355,273 which deals with one method of forming such fused fiber optic face plates. In this U.S. patent, heat for fusing purposes was employed in an environment surrounding an assembled closely packed fiber optical bundle arranged within a confining tubular housing of desired size while a superatmospheric pressure was applied to the bundle, and the upper end of the bundle was pressed by a platen of approximately the same size as the bundle. The amount of heat employed and the time during which this heat was applied were just sufficient to enable a fusing-together of adjacent cladding surfaces of the fiber optical elements or components and a superatmospheric pressure in an amount sufficient to exceed the equilibrium vapor pressure (in the order of 1000 pounds per square inch) of any gas which might otherwise be formed was maintained during the method steps. However, perfect face plates have not always resulted.

Further, in British patent specification No. 975,391, a generally similar fiber optical bundle being formed by fusing into a unitary structure was subjected to a pressure from one side thereof while the bundle was confined within a die-like member of U-shape cross-section but which was open at its opposite ends. While a fairly densely packed fiber optical structure was formed by this method, nevertheless, imperfections could result, for example, due to distortion of the fibers as a result of the application of the pressure from one side only during the heating and fusing operation as well as air trapped within the bundle.

The method and apparatus of the present invention, however, to a large degree, avoids such difficulties of prior art methods of manufacture by employing, on the one hand, means for extracting as much air and gases from within and around the enclosed packed assembled bundle of optical fibers before and during the initial parts of the processing thereof and, further, by providing high isostatic pressure conditions during the application of heat in an amount sufficient to fuse together the fiber optic elements thereof for forming an image-conducting face plate or the like, the method being such as to additionally maintain the high pressure condition upon the bundle even during at least a part of the cooling-down cycle employed in the process and thereby avoiding any tendency for formation of gas pockets or bubbles within the structure during the first part of the cooling cycle.

In fact, by the use of the improved process of the present invention using high isostatic pressures against all external surface portions of the fiber optic device being processed, it is possible to better reach all parts of the fiber optical structure in like manner and possible to more satisfactorily apply the process to fiber optic devices of greater cross-sectional size and of greater lengths than had been possible heretofore. Thus, it is possible to form elongated fiber optic billets from which a number of disk-like slabs can be subsequently cut for finishing into individual face plates; and face plates therefrom are not only impervious to air and the like but also noticeably free from included gas bubbles and the like. Furthermore, the individual light-conducting components or elements of the face plates are relatively free from distortion when considered in the cross-sectional direction thereof. This is so except for expected re-shaping of round fibers, for example, into generally hexagonally-shaped fibers when same are tightly packed and fused together.

It is, accordingly, an object of the present invention to provide a method and apparatus whereby bundles of clad light-conducting fibers of glass may be fused together to form fiber optic face plates and billets which are impervious to the passage of air or gases therethrough and also substantially free from entrapped bubbles of gases as well as comparatively free from undesired distortions in the individual light-conducting elements or components thereof.

Also, pre-fused fiber optic face plates and billets which have been formed by the technique and apparatus of the prior art disclosures mentioned above often may be improved if not entirely gas-impervious and free from gas inclusions if given an additional treatment using the improved method and apparatus of the present invention.

Other objects and advantages of the invention will become apparent from the detailed description which follows when considered in conjunction with the accompanying drawings in which.

Figure 1:
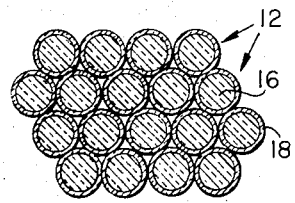
FIG. 1 is a fragmentary cross-sectional view of a part of an assembled bundle of many single light-conducting rod-like or fiber-like components of glass which are to be employed in carrying out the present invention.

The improved method of the present invention may be commenced by assembling, in known manner, a very large plurality of like single, light-conducting rod-like of fiber-like components of glass in side-by-side parallel closely packed regular relation to each other, such as is suggested by the showing in FIG. 1 to form a bundle of desired size. An assembly of closely packed single clad fiber optical elements or components is shown in FIG. 1 with individual components indicated by reference numeral 12 each comprising a glass core 16 of high refractive index and an outer glass cladding of a lower predetermined refractive index. While in this showing of FIG. 1 only a limited number of components for clarity and convenience have been indicated, nevertheless, it should be kept in mind that the number of light-conducting elements or components employed would ordinarily be very large since, as is well known in the art, for a face plate of given cross-sectional area, the degree of image resolution in the image transmitted thereby is directly enhanced by an increase in the number and a corresponding decrease in the size of the individual light-conducting components employed therein.

As assembly 20 of light-conducting components (see FIG. 3) thus formed can be of appreciable length since isostatic pressure conditions against all exterior parts of the bundle are to be employed during the forming of an integral billet therefrom, and when such is the case, larger disk-like plates and a larger number of such disk-like plates can be formed and sliced from a billet than was practical heretofore when using earlier-known methods when making image-conducting face plate devices.

Preferably, the assembled bundle would be completely surrounded by a thin envelope of non-reactive metal such as iron or stainless steel and such may be provided with longitudinally extending corrugations (not shown) in the side wall portions of the envelope for reasons presently to be described. It should be noted that the envelope 22 is closed at its opposite ends by cover means 22a and 22b likewise of thin metal and these parts should be seam-welded together in order to provide a gas-tight enclosure, except for a suitable elongated tubing 24 of like material intended for evacuation and support purposes as will be presently explained.

Figure 3:
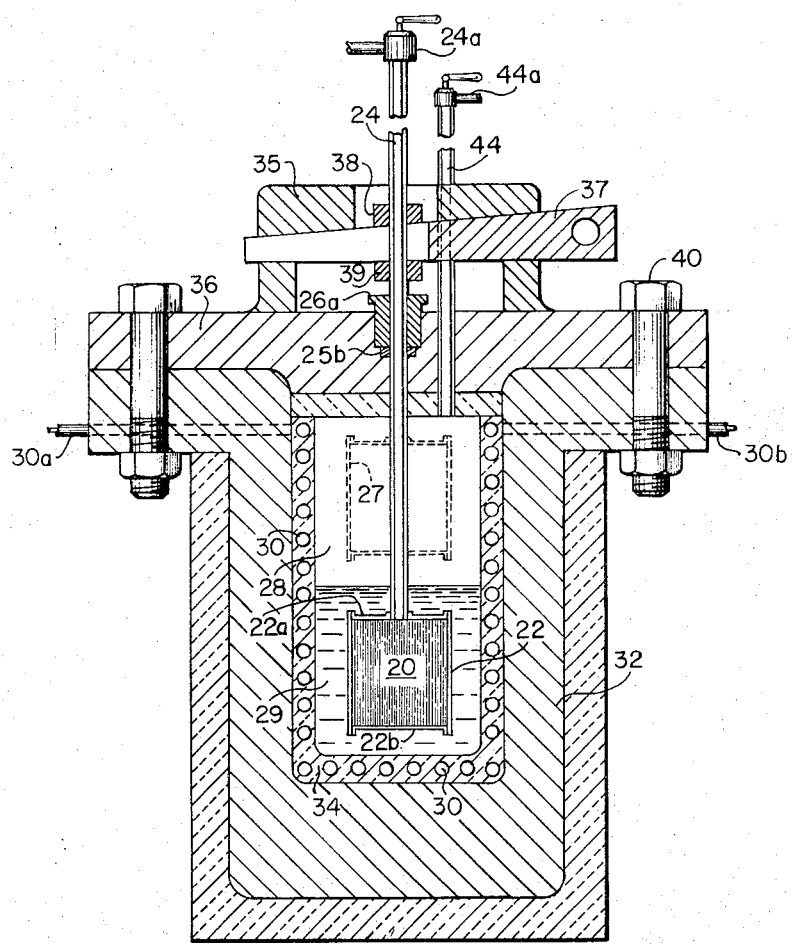
FIG. 3 is a vertical sectional view of apparatus which may be used in carrying out method steps of the present invention.

The thus enclosed assembly 20 supported by tubing 24 in the construction shown in FIG. 3 is initially positioned in a heating chamber 28 so as to be in an elevated position indicated by the dotted lines 27 above a quantity of low melting temperature metal or salt 29 occupying the lower part of the chamber 28. The tubing 24 extends through a cover member 36 for the chamber and this tubing is vertically slidable therein so that the height of the enveloped bundle may be changed as desired during different parts of the processing cycle.

The heating chamber is formed by a very heavy heating vessel 32 of high tensile strength steel, such as 4 to 6% chrome steel which is known to exhibit a very low creep rate, such that it can withstand very high pressures even while at an elevated temperature for glass-fusing purposes. Pressures up to as much as 20,000 pounds per square inch, while the temperature of the parts within the chamber 28 are elevated as high as 1400° F. are contemplated. A dense (non-porous) ceramic lining 34 is provided upon the inside walls of the vessel 32 and an electrical heating coil 30 is shown embedded therein; the opposite ends of which extend outwardly of the vessel and are indicated at 30a and 30b respectively. The very heavy cover 36, as shown, is bolted in place upon the vessel 32 by means of a plurality of bolts or the like 40 while the method is being performed.

It may be desirable to surround the heating vessel 32 with a heavy layer of heat-insulating material such as asbestos, as shown at 42, in order to confine the heat as much as possible within the chamber 28. Not only does the slidable tubing 24 for supporting the bundle 20 extend outwardly through the removable cover 36 but also a high pressure line 44 for supplying an inert gas to the interior of the vessel 32 is arranged to extend therethrough. The tubing 24 is provided with an adjustable bushing 25a and packing ring 25b which may be used to prevent the escape of high pressure gases at locations around this slidable tubing.

A yoke 35 integral with cover 36 is arranged to receive a tapered bifurcated key 37 which may be used when in its operative position in straddling relation to the tubing 24 to maintain the envelope bundle 20 in its lowered position by engagement of a pair of fixed collars 38, 39 upon the tubing for engagement with opposite sides of this tapered key.

A two-way valve 24a is shown for the control of vacuum to the interior of the envelope 22 and a two-way high pressure valve 44a is indicated for control of the high pressure line 44.

Thus, the arrangement of the improved apparatus just described for carrying out the method of the present invention is such as to allow the assembled fiber optic bundle 20 after being sealed within the metal envelope 22 and secured upon the tubing 24 for evacuation purposes to be lowered into the heating chamber 28 so as to occupy an upper space therein indicated by dotted lines 27 above the bath material 29 shown in the lower part of the chamber. This may be accomplished by the cover 36 being lowered into its operative position. As shown in FIG. 3, the cover is bolted in place by bolts 40, or it might be more desirable in practice to use a breach block type of loading fastening arrangement therefor which may be quickly locked in place by a quarter-turn action thereof, as is well known, after the cover is in its lowered position upon the housing 32.

At this time, the bath material would probably be in a solid form if it had not been preheated. However, after a vacuum is applied by means of the tubing 24 to the interior of the envelope 22 and billet 20 therein to extract as much of the air as possible from the interior of the envelope, the temperature within the chamber would be raised by heating coil 30 to a point above the melting temperature of the bath material. The envelope and billet would then be lowered by means of the tubing 24 and immersed within the bath of molten metal or molten salt 29. After evacuating the envelope as completely as possible through tubing 24 and as the temperature within the chamber 28 is rising, an inert gas such as nitrogen or carbon dioxide may be pumped into the interior thereof through pipe 44 in suitable amounts so as to exert a high pressure upon the top of the molten bath material. This molten bath may be metal such as tin or lead or could be a salt, such as sodium phosphate or an eutectic mixture such as barium chloride and magnesium chloride. At most times, the molten bath of salts would be preferred.

Thus, it should be appreciated that by use of the improved apparatus and method steps not only may most of the gases and air surrounding and within bundle 20 of light-conducting components which are to be fused together to form the integral face plate or billet may be easily initially extracted through tubing 24 but also by the use of the molten bath of metal or salt within which the enveloped assembly 20 is immersed, and by subjecting this bath to a high pressure by the gas being pumped into the chamber through pipe 44, an isostatic pressure condition of high unit intensity, which will similarly effect all surface portions of the billet being formed, may be applied and maintained not only while the billet is being heated to an elevated temperature sufficient to cause all of the adjacent surface portions of the light-conducting components to move into complete contacting relation to each other and become fused to each other but also this pressure may be maintained thereafter while the temperature is being lowered any desired amount. This high pressure may be of a value between 5000 and 20,000 pounds per square inch while a fusing temperature in a range from 1100° to 1400° F. is being provided.

It may be desirable to maintain the high isostatic pressure upon the enclosed bundle while the bundle is being gradually cooled down to its plastic flow temperature within a range between approximately 700° to 800° F., depending upon the types of glasses being used, at which time it might then be desirable to release such high pressure conditions and even desirable to then remove the billet from the chamber 28 and place same in an annealing oven for an extended controlled cooling cycle. In this fashion, the high pressure could be maintained upon the billet while there still remained any tendency for gases to form within the billet not only at or near fusing temperatures but continuously until the plastic flow temperature is reached. In this way, better results can be obtained than would be possible in cases wherein the pressure is relieved before the billet or face plate has started to cool.

Since isostatic pressure conditions from all sides exist, no more than very slight changes in cross-sectional shape of components will occur. On the ohter hand, the entrapped minute gases or pockets of air will be greatly reduced by this high pressure and even absorbed into the glass. Only a relatively short heating period at minimum fusing temperatures will ordinarily be employed and thus no detrimental effects to the light-conducting properties of the many light-conducting cores within the cladding glass of such a fused fiber face plate or billet will occur. The heated billet at 700° or thereabouts could then be removed from the chamber and placed in an annealing oven and annealed in whatever manner was desired in order to prevent the setting up of any unwanted stresses or striae within the relatively massive fused-together quantity of glass forming the fiber optic billet or face plate.

Figure 2:
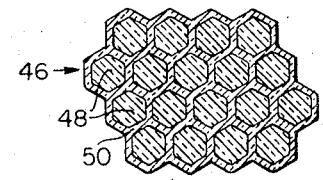
FIG. 2 is a fragmentary cross-sectional view of a part of a face plate or billet which has been formed using the method and apparatus of the present invention.

Such an integrally formed fused fiber optic billet may be thereafter sliced transversely by suitable means such as a diamond saw or the like into a plurality of individual disk-like members and each such member thereafter optically finished upon its opposite faces to form an air-impervious light-conducting fiber optical face plate or the like free from included gas pockets or bubbles and the optical imperfections caused thereby. In FIG. 2 is shown a fragmentary portion of such a fiber optic face plate 46 which has been evacuated, heated, pressed and fused into an integral member by the method and apparatus of the present invention. It will be seen that the individual light-conducting cores 48 of this plate are each completely surrounded and embedded in clear cladding glass 50 and, since this cladding glass has a lower refractive index than the core glass, light will be totally internally reflected as it passes from end-to-end therethrough.

Figure 4:
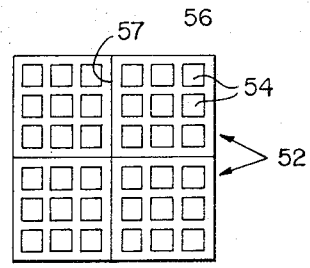
FIG. 4 is a fragmentary cross-sectional view of a part of an assembled bundle of many light-conducting multi-fiber components of glass which may likewise be employed in carrying out the method of the present invention.

Or, instead of using single core light-conducting components, a large plurality of preformed multifiber components, such as are indicated at 52 in FIG. 4, could be used. Each of these components, it will be appreciated, comprises a plurality of cores 54 of high index glass surrounded and fused together by a cladding glass 56 of lower refractive index. Four of these preformed multifibers are indicated in FIG. 4 in side-by-side relation so that their adjacent surfaces form unattached areas 57 and 58 therebetween. However, it will be appreciated that a very large number of multifibers would be employed when being assembled together to affect a billet of desired cross-sectional size to be processed. After the processing of such an assembly, the areas indicated by 57 and 58 in FIG. 4 would disappear.

Figure 5:
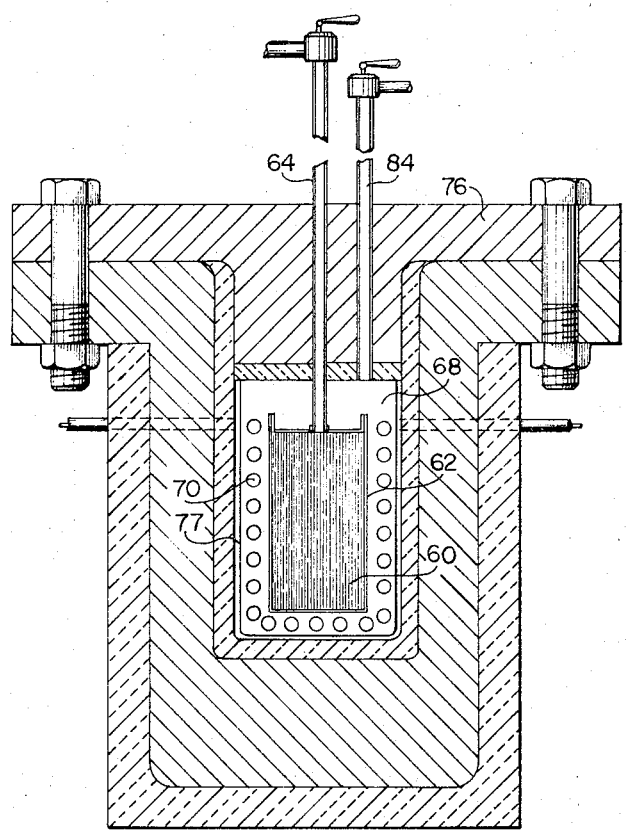
FIG. 5 is a vertical sectional view of a modified form of apparatus which may be employed.

In FIG. 5 is shown a modified form of apparatus which may be used in carrying out the invention. In this modified arrangement, the fluid bath for exerting isostatic pressure conditions is omitted and, instead, high pressure inert gas or air only within the heating chamber 68 is used and thus all parts of the outside of the encasing envelope 62 for the billet 60 will be isostatically subjected to this air pressure. The thin envelope 62, in this case, could be formed of thin metal (or glass since it would not be subject to attack by an immersing salt bath) but when air is used as the pressure medium, a perfect seal must be provided and maintained since any air which might penetrate into the interior of the envelope at high pressure would also permeate into the glass billet 60 and detrimentally affect the billet. When glass is used as the envelope, the pressure would not be applied within the chamber 28 until a time after the temperature therein is above the initial flow temperature of the glass in order to assure that no cracking of the envelope occurs.

The outer heavy steel housing 72 is much like that used in FIG. 3. However, instead of using a ceramic lining within the chamber 68 thereof and having the heating coils embedded therein, other types of insulating material may be used, and such an insulating lining of asbestos is indicated at 74 while the heating coils 70 are located inwardly thereof. A cylindrically-shaped metallic heat-reflective shield 77 is shown between the coils and the insulation material. In such an arrangement, only one operative position need be used for the billet while being heated, fused, and thereafter cooled at least to an intermediate temperature preparatory to the annealing cycle.

At times, it might be difficult to completely prevent gases from entering the interior of the envelope and, for this reason, the modified construction of FIG. 3 would be preferred since the molten bath material, even should same succeed in penetrating the envelope after higher pressures were reached, would not tend to permeate further into the billet and cause detriment thereto. However, such would not necessarily be the case if air seeped into the interior of the envelope. When a thin metal envelope is used, the thin corrugations thereof would allow the envelope to yield more readily while under pressure to the exact shape of the billet contained within. When a liquid-immersing bath is used, salt bars such as are used in heating metallurgical parts could be employed for applying the high liquid pressure to the billet within fusing range between 1100° and 1400° F.

While difficulty has been experienced heretofore in forming fiber optic face plates of sizes up to three inches which are free from included bubbles and the like, it is possible by following the teachings of the present invention to form billets of materially larger cross-sectional sizes and ones capable of producing face plates of as much as 16 x 16 inches and even larger are now contemplated.

Having described my invention, I claim:

1. Apparatus for forming a fused unitary gas-impervious bundle of juxtaposed glass light-conducting fibers corresponding opposite ends of which comprise light-receiving and light-emitting opposite ends of the bundle and said bundle being of appreciable length and cross-sectional size; said apparatus comprising:

an airtight envelope formed of a sheet material characteristically flexible at temperatures corresponding to softening temperatures of said glass fibers and lower said envelope having sides and opposite end portions for encasing the complete length and uniformly contacting opposite ends respectively of said bundle when said bundle is placed within said envelope;

a hollow main housing for receiving and enclosing said envelope and encased bundle during processing of said bundle;

means for evacuating air and gases from the interior of said envelope while said envelope is enclosed within said main housing;

a source of fluid under high pressure;

conduit means for supplying said fluid to the interior of said housing around said envelope for subjecting the entire length and opposite ends of said envelope pressure;

means within said housing for heating said evacuated envelope and a bundle of fibers contained therein to the fusing temperature of said fibers of said bundle while said envelope and bundle are subjected to said high fluid pressure whereby, with said fibers heated to above plastic flow temperature, the complete length and opposite ends respectively of said bundle are held under isostatic pressure during fusion of said fibers; and control means preventing release of said isostatic pressure until said bundle has been allowed to cool after fusion to a point below its plastic flow temperature.

2. The combination defined in claim 1 and wherein said main housing contains, within a lower part of its interior, material adapted to form a liquid bath when at an elevated temperature of a value less than that of the fusing temperature of said glass fibers, said interior being of such size as to accommodate said envelope and its enclosed bundle at an elevated position above said bath means for selectively moving said envelope and bundle from said elevated position into said liquid bath and means for applying said high fluid pressure to said bath for indirectly isostatically compressing said envelope and bundle.

References Cited
UNITED STATES PATENTS

| | | | |
|---|---|---|---|
| 3,224,851 | 12/1965 | Hicks, Jr. | 65—DIG. 7 |
| 3,275,428 | 9/1966 | Siegmund | 65—DIG. 7 |
| 3,355,273 | 11/1967 | Siegmund et al. | 65—32 X |
| 3,395,006 | 7/1968 | Hopkins et al. | 65—32 X |
| 3,457,054 | 7/1969 | Pei | 65—32 X |

FRANK W. MIGA, Primary Examiner

U.S. Cl. X.R.

65—157, 152, 182, DIG. 7, 155, 32